United States Patent
Millard et al.

(10) Patent No.: US 6,797,919 B1
(45) Date of Patent: Sep. 28, 2004

(54) LASER ABLATION NOZZLE ASSEMBLY

(75) Inventors: Ian Millard, San Jose, CA (US); Karl Pichler, Santa Clara, CA (US)

(73) Assignee: Osram Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 10/673,588

(22) Filed: Sep. 29, 2003

Related U.S. Application Data

(62) Division of application No. 10/325,066, filed on Dec. 20, 2002, now Pat. No. 6,683,277.

(51) Int. Cl.[7] .............................................. B23K 26/00
(52) U.S. Cl. ................................................. 219/121.84
(58) Field of Search ........................ 219/121.84, 121.6, 219/121.63, 121.65, 121.67, 121.68, 121.7

(56) References Cited

U.S. PATENT DOCUMENTS

| | | | | |
|---|---|---|---|---|
| 3,617,108 A | * | 11/1971 | Fritsch et al. ................ | 385/147 |
| 3,696,230 A | * | 10/1972 | Friedrich ................ | 219/121.75 |
| 4,025,787 A | * | 5/1977 | Janner et al. ................ | 250/251 |
| 4,179,599 A | * | 12/1979 | Conrad ................... | 219/121.36 |
| 5,214,921 A | * | 6/1993 | Cooley .................... | 60/641.15 |
| 5,756,962 A | * | 5/1998 | James et al. ........... | 219/121.75 |
| 5,837,960 A | * | 11/1998 | Lewis et al. ........... | 219/121.63 |
| 5,897,550 A | * | 4/1999 | Negus et al. ................ | 606/10 |
| 5,898,522 A | * | 4/1999 | Herpst ........................ | 359/511 |

FOREIGN PATENT DOCUMENTS

EP          0 600 250 A1   *   3/1993

\* cited by examiner

*Primary Examiner*—Samuel M. Heinrich
(74) *Attorney, Agent, or Firm*—Thomas George

(57) ABSTRACT

A laser ablation system includes a first embodiment of a nozzle assembly where a laser beam is emitted through the nozzle assembly to remove materials on a target. The nozzle assembly includes a nozzle having a top end, and a window placed on the top end of the nozzle. The window includes one or more apertures and the laser beam is emitted through one of those apertures.

Another laser ablation system includes a second embodiment of a nozzle assembly where a laser beam is emitted through the nozzle assembly to remove materials on a target. The nozzle assembly includes a nozzle having one or more channels at a top end of the nozzle. The nozzle assembly also includes a window that is placed on the one or more channels. A gas flows through the one or more channels and that gas flow reduces debris deposition on the window.

Yet another laser ablation system includes a third embodiment of a nozzle assembly that includes a nozzle that has a central channel aligned longitudinally through which said laser beam travels from a top end of said nozzle to a bottom end of said nozzle. In this embodiment, the central channel of the nozzle is threaded.

11 Claims, 6 Drawing Sheets

Laser Ablation System
203

Laser Ablation System
303

LASER ABLATION NOZZLE ASSEMBLY

CROSS-REFERENCE TO RELATED APPLICATIONS

This application is a division of applicant's application having application Ser. No. 10/325,066, now U.S. Pat. No. 6,683,277, filed Dec. 20, 2002 and titled "Laser Ablation Nozzle Assembly".

BACKGROUND OF THE INVENTION

1. Field of the Invention

This invention relates generally to a laser ablation system and in particular to a laser ablation nozzle assembly.

2. Description of the Related Art

Laser ablation and in particular ultraviolet ("UV") laser ablation is widely used, for example, to remove materials from substrates. Such materials may be inorganic or organic (e.g., photo-resists and polymers) and often these to-be removed materials are in thin-film form coated on a substrate. For example, materials are removed using laser ablation to produce a via hole so that there is electrical contact between a top conductive layer and a bottom conductive layer through the via hole. In another example, materials are removed from areas of a thin-film electronic device using laser ablation so that those areas can be used to encapsulate the electronic device. In this case, an inorganic substrate (e.g., a glass substrate) is coated with organic layers (e.g., photo-resist layers or polymer layers) and the resulting electronic device is encapsulated by mating a cover/encapsulating sheet (e.g., metal cans and glass sheets) with the substrate by gluing the two together with, for example, a UV-cure material. Often, however, the bonding of the glue to the substrate when certain organic layers are present on the substrate is not good and hence laser ablation is used to remove the organic layers from the substrate to allow for better bonding between the cover/encapsulating sheet and the substrate.

In yet another example, laser ablation is used where an inorganic substrate (e.g. a glass substrate) is coated with organic layers (e.g., photo-resist layers or polymer layers) and the resulting electronic device is encapsulated with a sputtered or evaporated organic and/or inorganic material. Bonding between the encapsulating material and the substrate when the organic layers are present on the substrate is not good and hence laser ablation is used to remove the organic layers from the substrate to allow for better bonding between the encapsulating material and the substrate. Materials may also be removed from areas on the electronic device which when exposed to humidity and oxygen cause corrosion.

Laser ablation systems that perform the above functions are commercially available from, for example, Resonetics Corporation of Nashua, New Hampshire, or Exitech Limited of Oxford, England FIG. 1 shows a prior art laser ablation system 103. The laser ablation system 103 includes a nozzle assembly 134 that includes a nozzle 113 and a window 122. The nozzle 113 has a top end and a bottom end. The window 122 is on the top end of the nozzle 113 and the bottom end of the nozzle is in close proximity to a target 110 (e.g., a substrate) on which the materials (e.g., polymers, photo-resists, and thin films) that are to be laser ablated reside. A laser beam 125 enters the nozzle 113 by passing through a window 122 that is transparent. The window 122 may be comprised of transparent materials such as, for example, quartz or glass.

The laser beam 125 is generated by a laser assembly 131 located above the nozzle 113. The laser assembly 131 includes the laser, laser optics, and other components used to generate and position the laser beam 125. The window 122 protects the laser optics and other components within the laser assembly 131 from debris 116. The laser beam 125 travels from a top end of the nozzle 113 to the bottom end of the nozzle 113.

The debris 116 is generated by the laser beam 125 ablating the materials resulting in ejection of the debris 116 from the ablation point. Suction pumps can be used to create a vacuum or a gas flow within a vacuum channel 119 to remove the debris 116 by sucking the debris 116 away from the target 110. However, even with the vacuum or gas flow, the debris 116 may be re-deposited on the target 110 around the ablation point, and/or the debris 116 may be re-deposited on the window 122 thus obstructing the laser beam path. When the debris 116 is re-deposited on the target 110, the re-deposited debris can cause, for example, weaker bonding between the target 110 and the glue, or contaminate the target 110 thus adversely affecting the electrical/optical performance of the resulting electronic device fabricated on the target 110. When the debris 116 is re-deposited on the window 122, the debris 116 can cause a reduction in the laser beam intensity at the ablation point, fluctuation in beam intensity at the ablation point resulting in poor uniformity in processing the materials, rapid degradation of the window, permanent window damage, and high costs associated with frequent replacing or cleaning of the window.

Therefore, there is a need to reduce the debris deposition on the window and also to reduce the amount of debris being redeposited onto the target.

SUMMARY

An embodiment of a nozzle assembly within a laser ablation system is described that, for example, reduces debris deposition on a window. The embodiment of the nozzle assembly includes a nozzle that has a top end and the window is located on the top end of the nozzle. The window has at least one aperture and a laser beam is emitted through a particular one of the at least one aperture.

An embodiment of a method is described that, for example, reduces debris deposition at one or more points on a window of a laser ablation system The embodiment of this method includes generating a laser beam, and emitting the laser beam through an aperture at one of the points on the window.

Another embodiment of a nozzle assembly within a laser ablation system is described that, for example, reduces debris deposition on the window. This embodiment of the nozzle assembly includes a nozzle having at least one channel at a top end of the nozzle, a window located on the at least one channel, and a gas that flows through the at least one channel. The gas flow through the at least one channel reduces debris deposition on the window.

Another embodiment of a method is described that, for example, reduces debris deposition on a window of a laser ablation system. This embodiment of the method includes moving a gas through at least one channel that contacts the window to reduce the accumulation of debris on the window.

Yet another embodiment of a nozzle assembly within a laser ablation system is described that, for example, reduces the debris being re-deposited onto a target This embodiment of the nozzle assembly includes a nozzle that has a central channel aligned longitudinally and through which a laser beam travels from a top end of the nozzle to a bottom end of the nozzle. The nozzle assembly also includes a window located on the top end of the nozzle. In this embodiment, the central channel is threaded.

DETAILED DESCRIPTION

A laser ablation system includes a first embodiment of a nozzle assembly where a laser beam is emitted through the nozzle assembly to remove materials on a target. The nozzle assembly includes a nozzle having a top end, and a window placed on the top end of the nozzle. The window includes one or more apertures and the laser beam is emitted through one of those apertures.

Another laser ablation system includes a second embodiment of a nozzle assembly where a laser beam is emitted through the nozzle assembly to remove materials on a target. The nozzle assembly includes a nozzle having one or more channels at a top end of the nozzle. The nozzle assembly also includes a window that is placed on the one or more channels. A gas flows through the one or more channels and that gas flow reduces debris deposition on the window.

Yet another laser ablation system includes a third embodiment of a nozzle assembly where a laser beam is emitted through the nozzle assembly to remove materials on a target. The nozzle assembly includes a nozzle that has a central channel aligned longitudinally through which said laser beam travels from a top end of said nozzle to a bottom end of said nozzle. A window is placed on the top end of the nozzle. In this embodiment, the central channel of the nozzle is threaded.

Figure 1:
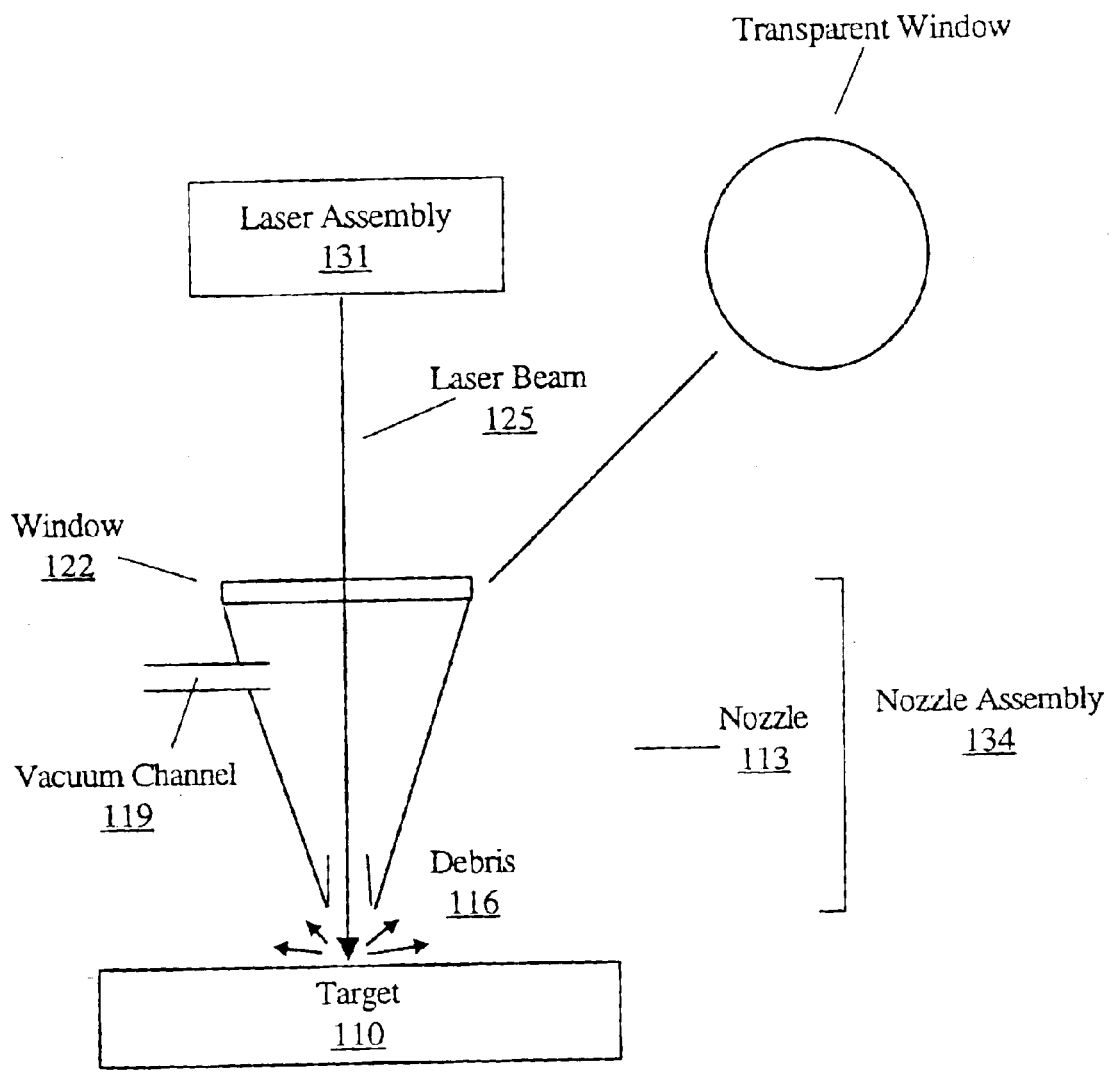
FIG. 1 shows a prior art laser ablation system.
Figure 2:
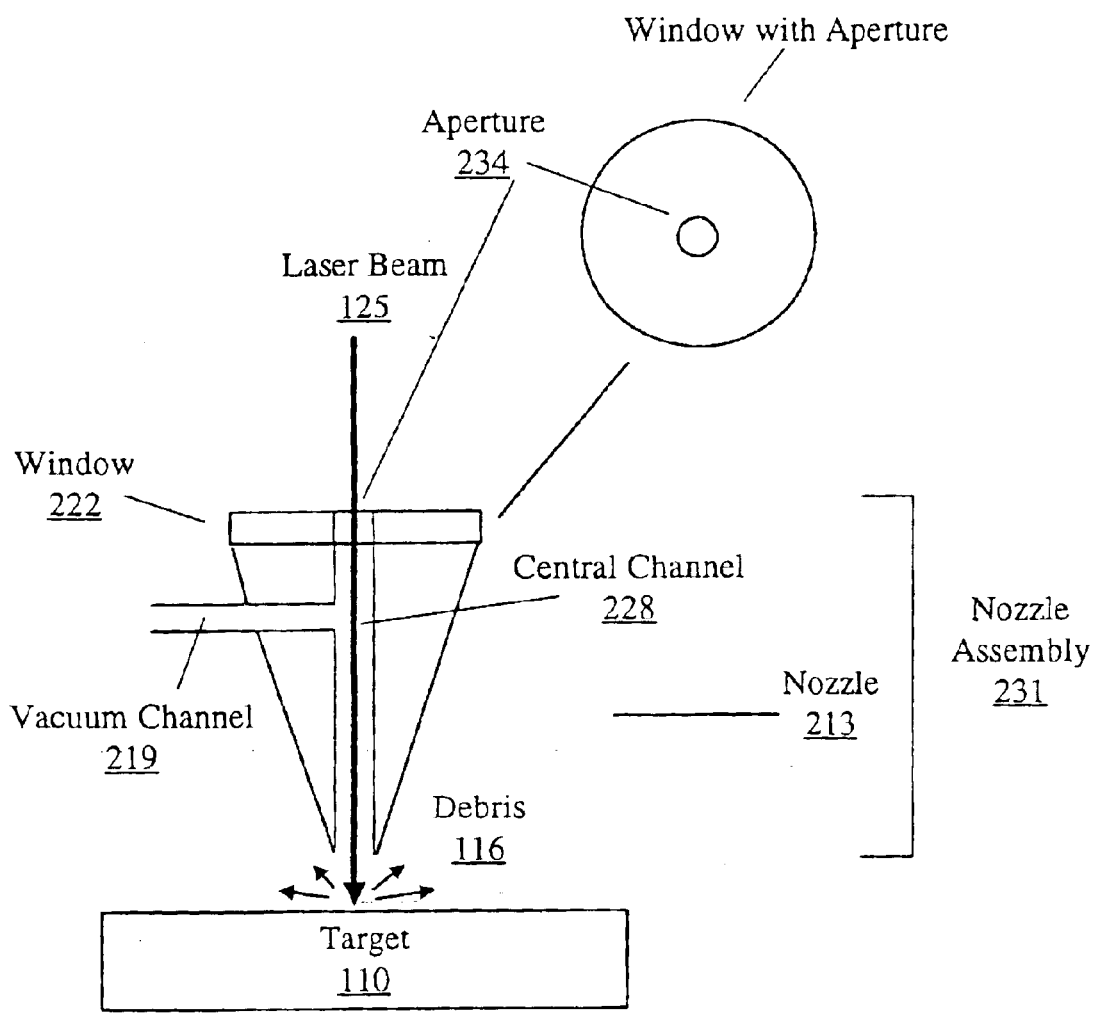
FIG. 2 shows a first embodiment of a nozzle assembly within a laser ablation system.

FIG. 2 shows a first embodiment of a nozzle assembly 231 within a laser ablation system 203. A laser beam 125 travels through the nozzle assembly 231 to remove materials on a target 110. The target 100 can be coated with electrically and/or optically active organic materials such as, for example, conductive polymers and/or conjugated polymers, molecules, dentrimers, oligomers, fluorescents, or phosphorescents. The resulting electronic device can be, for example, an organic thin-film transistor, a light detector, a solar cell, or an organic light emitting device ("OLED") (the OLEDs can be used in, for example, signs, displays or as the light source elements of a light source).

The nozzle assembly 231 includes a nozzle 213 and a window 222. The nozzle 213 has a top end and a bottom end. The window 222 is on the top end of the nozzle 213 and the bottom end of the nozzle is in close proximity to a target 110 on which the materials (e.g., polymers, photo-resists, and thin films) that are to be laser ablated reside. The nozzle 213 may have any shape such as, for example, a cone (as shown in FIG. 2), an inverted cone, a triangle, or a cylinder. The laser beam 125 enters the nozzle 213 through the window 222. The laser beam 125 is generated by a laser assembly located above the nozzle assembly 231. The window 222 protects the laser optics and other components within the laser assembly from debris 116. The window 222 can be comprised of transparent materials such as quartz or glass. Alternatively, the window 222 can be comprised of opaque materials such as an opaque metal or plastic or a coated material such as quartz or glass with a coating.

The window 222 includes an aperture 234 and the laser beam 125 is emitted through the aperture 234. The aperture 234 can be of any size. For example, the diameter of the aperture 234 can be greater than or equal to the diameter of the laser beam 125 to minimize the loss of the laser beam's 225 intensity by allowing the laser beam 125 to pass through unimpeded. Alternatively, the diameter of the aperture 234 can be less than the diameter of the laser beam 125 so that the aperture 234 acts as a beam mask to further limit or define the laser beam dimensions. The aperture 234 can of any shape. For example, the aperture can have a circular shape (as shown in FIG. 2), a square shape, or a rectangular shape. The aperture 234 can be mechanically operated to change its size or shape depending on the process to be performed. The window 222 may include more than one aperture. The additional apertures can be covered with a transparent material. The additional apertures can be used, for example, to provide illumination or optical viewing. In addition, with an adjustable window (e.g., a sliding or rotatable window) and multiple apertures, the window can be adjusted such that the laser beam passes through one of the other apertures when the previous aperture becomes too dirty and/or damaged.

The laser beam 125 travels from a top end of the nozzle 213 to the bottom end of the nozzle 213 through a central channel 228. The debris 116 is generated by the laser beam 125 ablating the materials resulting in ejection of the debris 116 from the ablation point. Suction pumps can be used to create a vacuum or gas flow within a vacuum channel 219 to remove the debris 116 by sucking the debris 116 away from the target 110. Gas entering from the bottom end of the nozzle 213 and/or from the aperture 234 on the window 222 are pumped out through the vacuum channel 219 creating a gas flow that removes the debris 116. In one configuration of this embodiment, only one vacuum channel is used, however, in other configurations, multiple vacuum channels can be used to remove the debris 116 and these vacuum channels can be placed anywhere on the nozzle 213. As used within the specification and the claims, the term "channel" includes, for example, a slit, a slot, an opening, a hole, a gap, or a chamber. The channel can have various geometrical shapes such as, for example, a rectangular shape (as shown in FIG. 2), a circular shape, or an oval shape.

Figure 3:
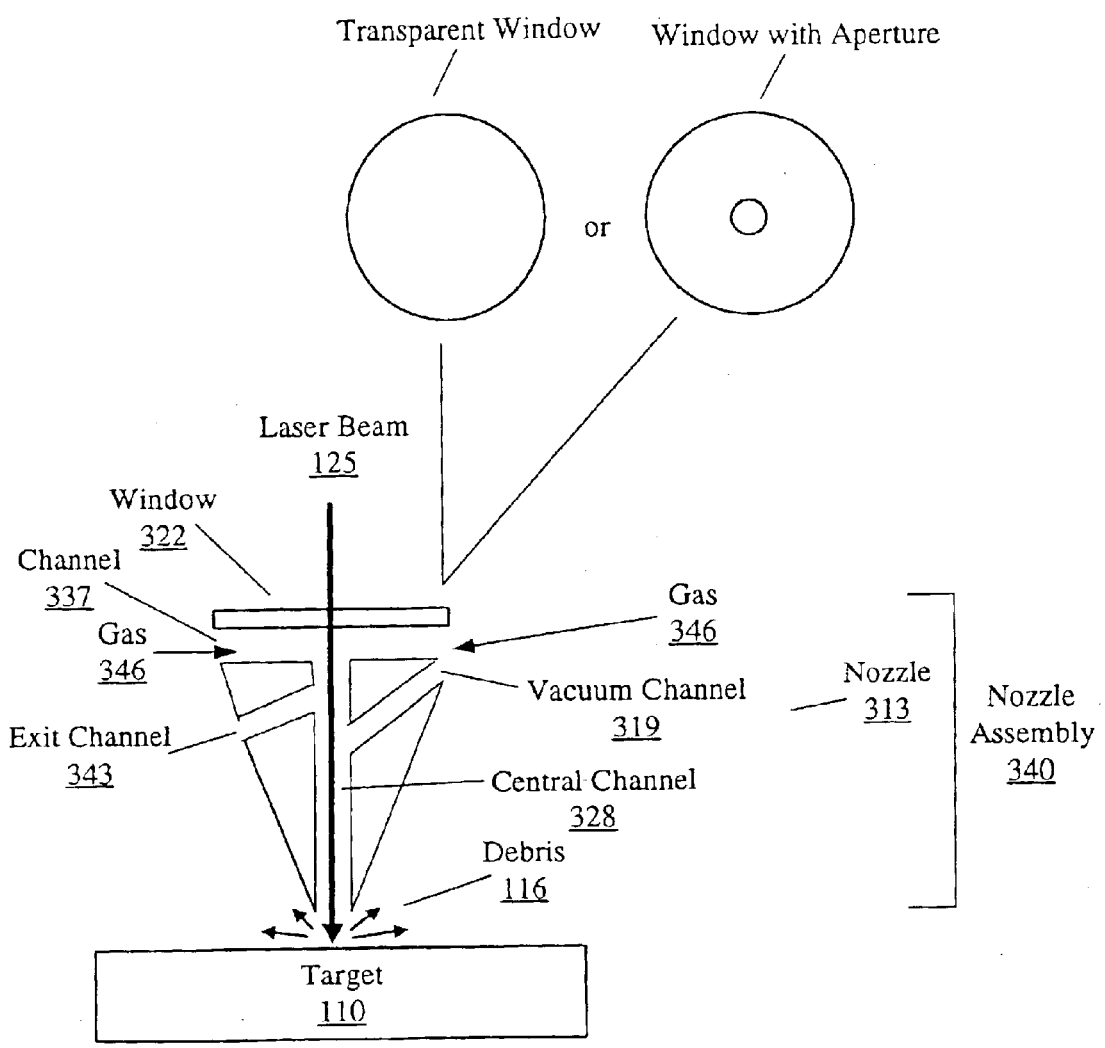
FIG. 3 shows a second embodiment of a nozzle assembly within a laser ablation system.

FIG. 3 shows a second embodiment of a nozzle assembly 340 within a laser ablation system 303. The laser beam 125 is emitted through the nozzle assembly 340 to remove materials on the target 110. The nozzle assembly 340 includes a nozzle 313 and a window 322. The nozzle 313 has a top end and a bottom end. A channel 337 is at the top end of the nozzle 313. In this configuration of this embodiment, only one channel is used, however, in other embodiments, multiple channels can be used to pass a gas 346 across the window 322. The window 322 is placed on the channel 337 such that the window 322 is in contact with the channel 337. The bottom end of the nozzle is in close proximity to a target 110 on which the materials that are to be laser ablated reside. The nozzle 313 may have any shape such as, for example, a cone (as shown in FIG. 3), an inverted cone, a triangle, or a cylinder. The laser beam 125 enters the nozzle 313 through the window 322. The window 322 can have no aperture, or one or more apertures. If the window 422 includes one or more apertures, then those apertures can be any shape or size.

A gas 346 moves through the channel 337 and the flow of the gas 346 across or through the window 322 reduces debris accumulation on the window 322. By reducing the debris accumulation on the window 322, there may be less debris on the laser beam path resulting in a greater beam intensity at the ablation point, greater uniformity in processing the materials on the target 110, decreased degradation of the window 322, and reduced costs resulting from not having to frequently replace or clean the window 322. The gas 346 includes a gas or a mixture of gasses that can carry debris away, that is used in the ablation process to prevent contamination of the resulting electronic device, or that assist in the ablation of material from the substrate. The gas 346 includes, for example, air, dry air, nitrogen, argon or a mixture of these gasses. The gas 346 is evacuated (e.g., pumped out) from the nozzle 313 through an exit channel 343. In this configuration of this embodiment, only one exit channel is used, however, in other configurations multiple exit channels can be used to evacuate the gas 346 from the nozzle 313. These exit channels can be placed anywhere on the side of the nozzle 313.

In another configuration, the channels guide the gas 346 directly to the point where the laser beam passes through the window 322 in order to reduce the amount of debris deposition at this point. In yet another configuration, the window 322 has an aperture and the gas 346 may or may not flow through the aperture (the gas flow through the aperture is in addition to the gas flow across the window 322).

The laser beam 125 travels from a top end of the nozzle 313 to the bottom end of the nozzle 313 through a central channel 328. The debris 116 is generated by the laser beam 125 ablating the materials resulting in ejection of the debris 116 from the ablation point. Suction pumps can be used to create a vacuum within a vacuum channel 319 to remove the debris 116 by sucking the debris 116 away from the target 110. In one configuration of this embodiment, only one vacuum channel is used, however, in other configurations, multiple vacuum channels can be used and these vacuum channels can be placed anywhere on the nozzle 313. In another configuration, the debris 116 and the debris deposition at the window 322 can be removed through the same channel or same channels if multiple channels are used.

Figure 4:
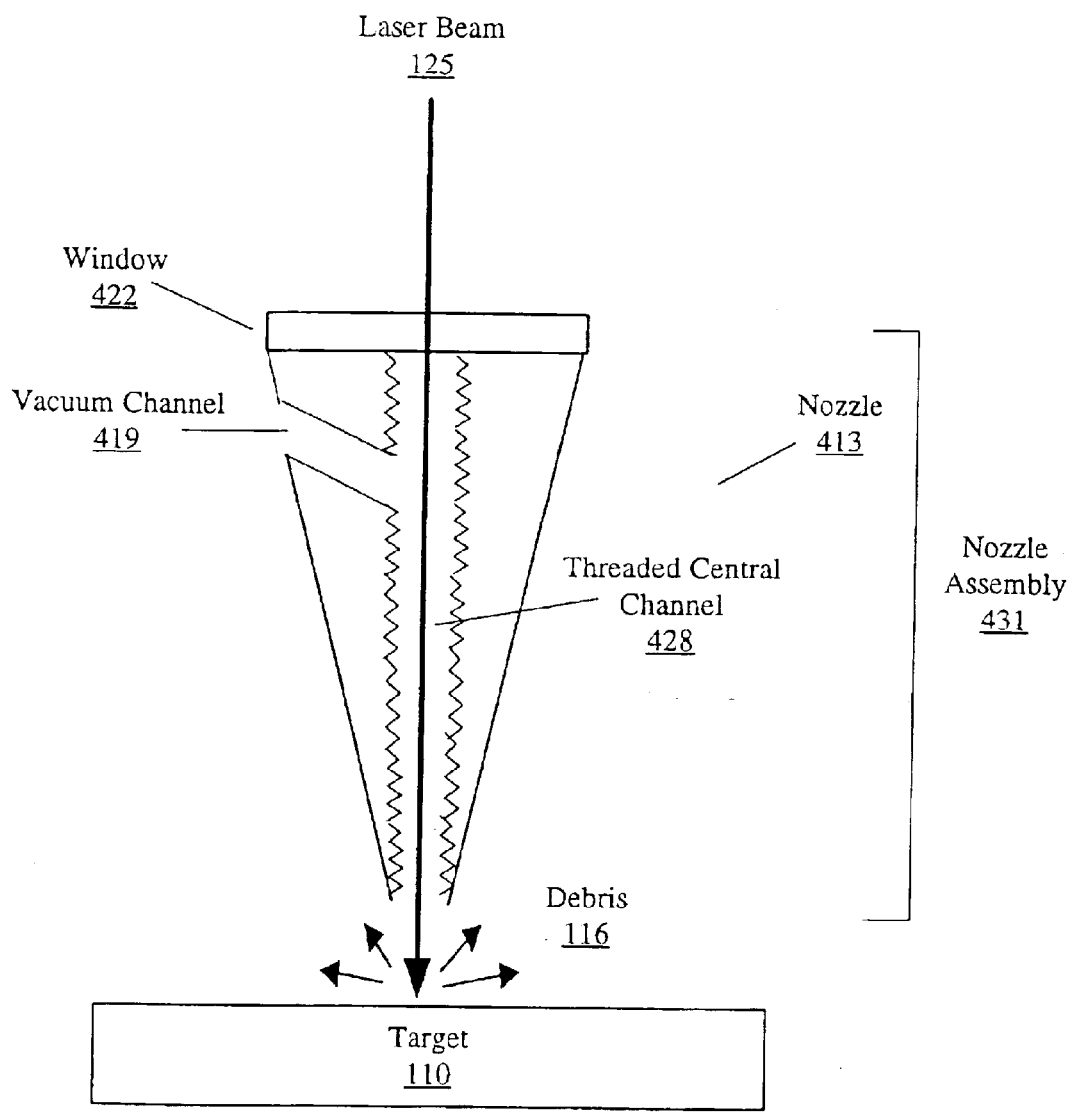
FIG. 4 shows a third embodiment of a nozzle assembly within a laser ablation system.

FIG. 4 shows a third embodiment of a nozzle assembly 431 within a laser ablation system 403. A laser beam 125 travels through the nozzle assembly 431 to remove materials on the target 110. The nozzle assembly 431 includes a nozzle 413 and a window 422. The nozzle 413 has a top end and a bottom end. The window 422 is on the top end of the nozzle 413 and the bottom end of the nozzle 413 is in close proximity to the target 110 on which the materials that are to be laser ablated reside. The nozzle 413 may have any shape such as, for example, a cone (as shown in FIG. 4), an inverted cone, a triangle, or a cylinder. The laser beam 125 enters the nozzle 413 through the window 422.

The laser beam 125 travels from the top end of the nozzle 413 to the bottom end of the nozzle 413 through a central channel that is threaded (i.e., a threaded central channel 428). The threaded central channel 428 is formed by machining threads to the central channel. By threading the central channel, a less turbulent flow is created that captures more of the debris 116 resulting in better removal of the debris 116 and a reduction of the amount of debris 116 re-deposited on the materials on the target 110 or re-deposited on the window 422. The gas entering from the bottom end of the nozzle 413, and/or if the window 422 has an aperture, the gas entering from an aperture on the window 422, are pumped out through the vacuum channel 419 and because of the threads, the gas being pumped out creates a cork-screw type flow that is less turbulent allowing better removal of the debris from the ablated materials on the target 110 and reducing the amount of debris 116 re-deposited on the window 422.

Figure 5:
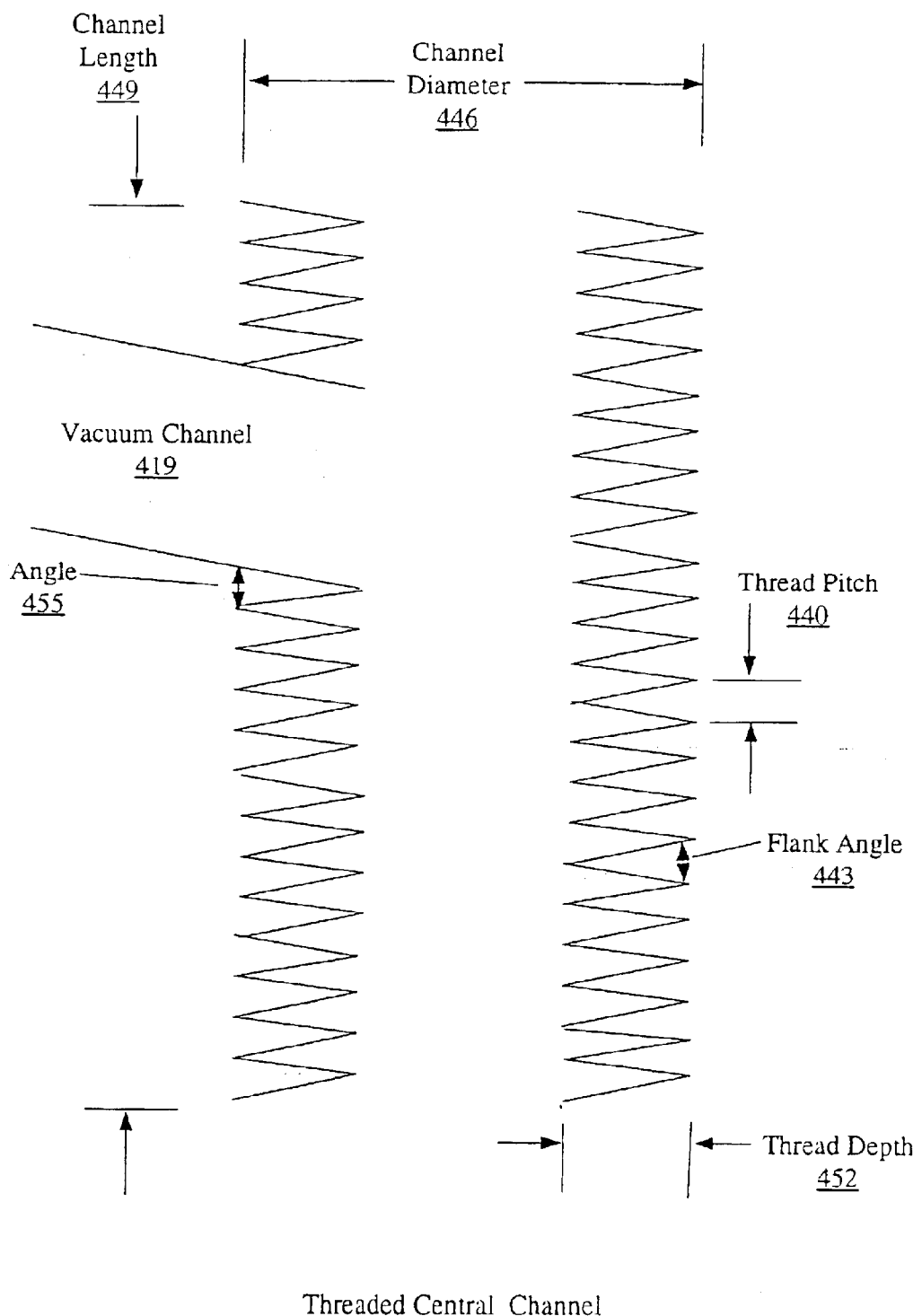
FIG. 5 shows an embodiment of a threaded central channel according to the present invention.

FIG. 5 shows an embodiment of the threaded central channel 428 according to the present invention. A thread pitch 440 is the distance between two adjacent threads of the threaded central channel 428. A thread depth 452 is the depth of one of the threads of the threaded central channel 428. A flank angle 443 is the angle between two adjacent threads of the threaded central channel 428. A channel length 449 is the length of the threaded central channel 428. A channel diameter 446 (or major diameter) is the outside diameter of the male threads of the threaded central channel 428. All of the above parameters of the threaded central channel 428 can be modified to change the flow created within the threaded central channel 428. In another configuration of this embodiment, the threads are rounded (e.g., each of the threads has a semicircular shape rather than a triangular shape).

In this configuration of this embodiment, the vacuum channel 419 is angled such that there is a smooth transition from the threads of the central channel to the vacuum channel 419 (i.e., an angle 455 between a thread of the central channel and the vacuum channel 419 is equal to the flank angle 443). Specifically, the vacuum channel 419 is a smooth continuation of the threaded central channel 428 so as to reduce any points or areas that create turbulence. In another configuration, the transition from the threads of the central channel to the vacuum channel 419 is not smooth (i.e., the angle 455 between the thread of the central channel and the vacuum channel 419 is not equal to the flank angle 443).

In one configuration of this embodiment, a diameter of the vacuum channel 419 is greater than the thread pitch 440 (as shown in FIG. 5); alternatively, the diameter of the vacuum channel 419 can be the same or close to the thread pitch 440.

Referring back to FIG. 4, the window 422 can be transparent or opaque. The window 422 can have no aperture, or one or more apertures. If the window 422 includes apertures, then those one or more apertures can be any shape or size. In this configuration of this embodiment, only one vacuum channel is used, however, in other configurations, multiple vacuum channels can be used and these vacuum channels can be placed anywhere on the side of the nozzle 413.

Figure 6:
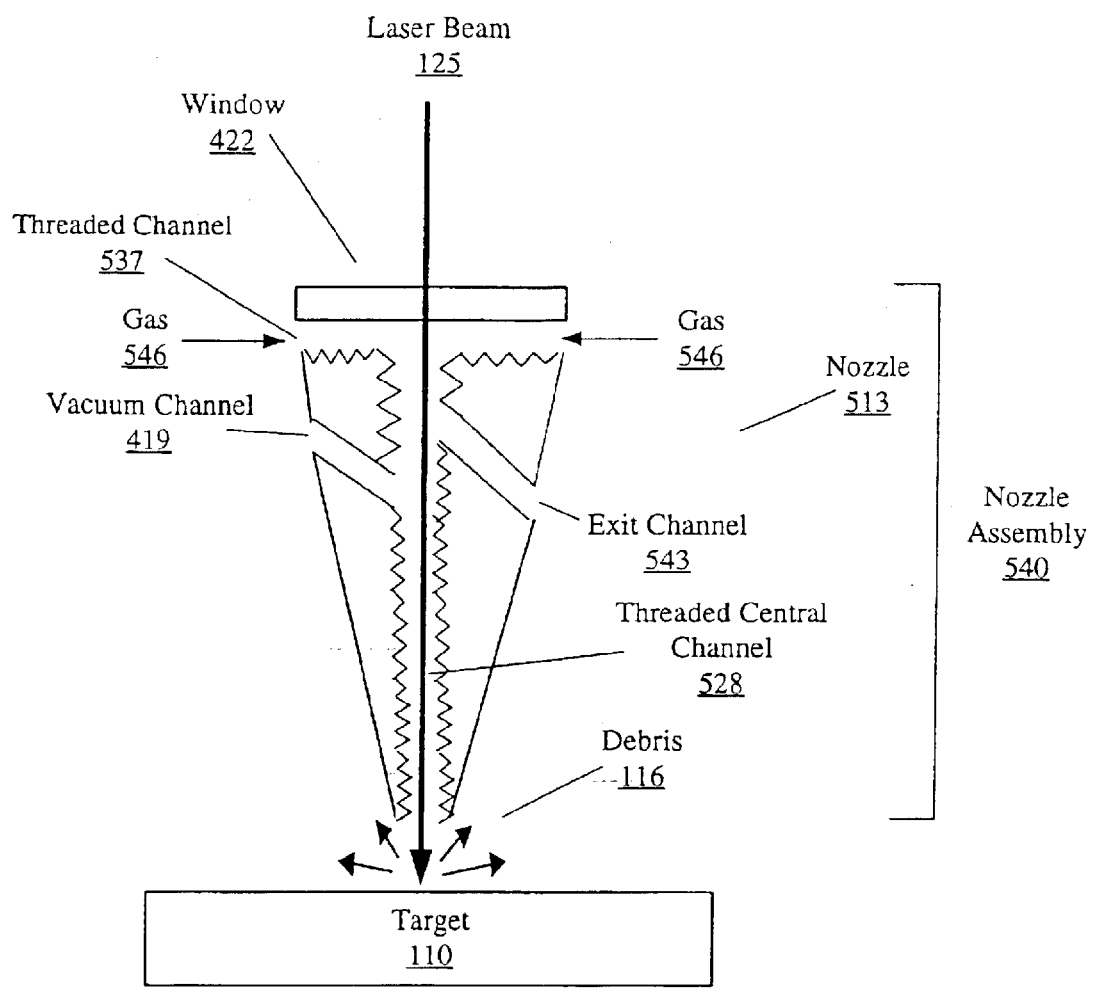
FIG. 6 shows a fourth embodiment of a nozzle assembly within a laser ablation system.

FIG. 6 shows a fourth embodiment of a nozzle assembly 540 within a laser ablation system 503. The nozzle assembly 540 includes a nozzle 513 and a window 422. The nozzle 513 has a top end and a bottom end. A threaded channel 537 is at the top end of the nozzle 513. In this configuration of this embodiment, only one channel is used, however, in other configurations, multiple channels can be used to pass a gas 546 across the window 422. The window 422 is placed on the threaded channel 537 such that the window 422 is in contact with the threaded channel 537. The bottom end of the nozzle is in close proximity to a target 110 on which the materials that are to be laser ablated reside. The nozzle 513 may have any shape such as, for example, a cone (as shown in FIG. 6), an inverted cone, a triangle, or a cylinder.

A gas 546 moves through the threaded channel 537 and the flow of the gas 546 across the window 422 reduces debris accumulation on the window 422. The threaded channel 537 is formed by machining threads to that channel. By using the threaded channel 537, a flow is created that better captures more of the debris 116 across the window 422 resulting in better removal of that debris from the window 422. The gas 546 entering the threaded channel 537 is pumped out through an exit channel 543 and because of the threads, the gas being pumped out creates a cork-screw type flow that better removes the debris across the window 422. The gas 546 includes a gas or a mixture of gasses that can carry debris away, that is used in the ablation process to prevent contamination of the resulting electronic device, or that assist in the ablation of material from the substrate. The gas 546 includes, for example, air, dry air, nitrogen, argon or a mixture of these gasses. In this configuration of this embodiment, only one exit channel is used, however, in other configurations multiple exit channels can be used to evacuate the gas 546 from the nozzle 513. These exit channels can be placed anywhere on the side of the nozzle 513.

In one configuration of this embodiment, a threaded central channel 528 is used in the nozzle 513. The threads of the central channel provide the benefits described earlier. In another configuration, a non-threaded central channel is used within the nozzle 513. In one configuration of this embodiment, only one vacuum channel is used, however, in other configurations, multiple vacuum channels can be used and these vacuum channels can be placed anywhere on the side of the nozzle 513.

The thread parameters (e.g., the thread pitch 440 and the thread depth 452) of the channel used to reduce debris accumulation at the window 422 (e.g., the threaded channel 537) can be the same or differ from the thread parameters of the channel that removes the debris 116 (e.g., the threaded central channel 528). The thread parameters of these channels are adjusted to optimize the gas flow, reduce the turbulence, and optimize debris removal.

As any person of ordinary skill in the art of laser ablation will recognize from the description, figures, and examples that modifications and changes can be made to the preferred embodiments of the invention without departing from the scope of the invention defined by the following claims.

What is claimed:

1. Within a laser ablation system, a nozzle assembly and a laser beam that travels through said nozzle assembly to remove materials on a target, said nozzle assembly comprising:
    a nozzle having at least one channel at a top end of said nozzle;
    a window on said at least one channel; and
    a gas that flows through said at least one channel, wherein said gas flow reduces debris deposition on said window.

2. The nozzle assembly of claim 1 further comprising
    at least one exit channel on a side of said nozzle through which said gas evacuates from said nozzle.

3. The nozzle assembly of claim 1 wherein said gas is any one of nitrogen, argon, air, dry air, or a mixture of gasses.

4. The nozzle assembly of claim 1 wherein said window includes at least one aperture.

5. Within a laser ablation system, a method to reduce debris deposition on a window, comprising:
    moving a gas through at least one channel that contacts said window to reduce accumulation of said debris on said window.

6. The method of claim 5 further comprising
    evacuating said gas from said at least one channel.

7. Within a laser ablation system, a nozzle assembly and a laser beam that is emitted through said nozzle assembly to remove materials on a target, said nozzle assembly comprising:
    a nozzle that includes a central channel through which said laser beam travels from a top end of said nozzle to a bottom end of said nozzle; and
    a window on said top end of said nozzle,
    wherein said central channel is threaded.

8. The nozzle assembly of claim 7 wherein said nozzle includes at least one channel at said top end of said nozzle, and wherein said window is in contact with said at least one channel, and further comprising a gas that flows through said at least one channel, wherein said at least one channel is threaded.

9. The nozzle assembly of claim 8 further comprising
    at least one vacuum channel on a side of said nozzle, said at least one vacuum channel evacuates said gas from said threaded central channel; and at least one exit channel on said side of said nozzle, said at least one exit channel evacuates said gas from said at least one threaded channel.

10. The nozzle assembly of claim 7 wherein said window includes at least one aperture.

11. The nozzle assembly of claim 8 wherein said gas is any one of nitrogen, argon, air, dry air, or a mixture of gasses.

* * * * *